United States Patent
Kitai et al.

(10) Patent No.: US 6,404,766 B1
(45) Date of Patent: Jun. 11, 2002

(54) NETWORK DATA COMMUNICATION SYSTEM

(75) Inventors: Katsuyoshi Kitai, Kokubunji; Yoshimasa Masuoka, Kodaira; Satoshi Yoshizawa, Musashino; Frederico Buchholz Maciel, Kokubunji, all of (JP); Toshiaki Tarui, Menlo Park, CA (US); Tatsuo Higuchi, Hillsboro, OR (US); Hideki Murahashi, Hachiouji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/773,315

(22) Filed: Dec. 24, 1996

(30) Foreign Application Priority Data

Dec. 29, 1995 (JP) ............................... 7-354020

(51) Int. Cl.$^7$ .............................................. H04L 12/56
(52) U.S. Cl. ....................................... 370/392; 370/401
(58) Field of Search ................................ 370/400, 401, 370/402, 403, 404, 405, 406, 389, 390, 392, 393, 474, 475, 396, 399, 395.52, 395.54; 713/201; 709/242, 250, 228

(56) References Cited

U.S. PATENT DOCUMENTS

| | | | | |
|---|---|---|---|---|
| 5,309,437 A | * | 5/1994 | Perlman | 370/401 |
| 5,420,862 A | * | 5/1995 | Perlman | 370/401 |
| 5,500,860 A | * | 3/1996 | Perlman | 370/401 |
| 5,781,550 A | * | 7/1998 | Templin et al. | 370/401 |
| 5,828,844 A | * | 10/1998 | Civanlar et al. | 370/395 |
| 6,058,429 A | * | 5/2000 | Ames et al. | 370/399 |

OTHER PUBLICATIONS

"Internetworking With TCP/IP", vol. 1, Prentice Hall, by Douglas E. Comer.
"UNIX Network Programming", W.D. Stevens, Prentice Hall.
"ATM internetworking" by Anthony Alles, Cisco Systems, Inc.

* cited by examiner

Primary Examiner—Huy D. Vu
Assistant Examiner—Phuoychau Ba Nguyen
(74) Attorney, Agent, or Firm—Antonelli, Terry, Stout & Kraus, LLP

(57) ABSTRACT

In order to execute a flow control and a congestion control in a hop-by-hop manner in a data communication among computers connected to different networks, in a data communication between a client A1 and a remote server B, a communication proxy of the remote server B is located in a local server A in an LAN to which the client A belongs. A communication packet to be routed to the remote server B is stolen (received) and passed to a transport layer. A TCP communication between the client A1 and the remote server B is divided into two; a communication between the client A1 and the communication proxy of the remote server B and a communication between the communication proxy of the remote server B and the remote server B.

3 Claims, 9 Drawing Sheets

FIG. 7a

```
define  SERV_TCP_PORT   6001         ~~701 fd = socket (AF_INET, SOCK_STREAM, 0);   ~~702
serv_addr . sin_family = AF_INET;   ~~703
serv_addr . sin_addr. s_addr = htonl (INADDR_ANY);   ~~704
serv_addr . sin_port = htons (SERV_TCP_PORT);        ~~705 bind (fd , (struct sockaddr *) & serv_addr,   ~~706
      sizeof (serv_addr) );

listen (fd , 5);   ~~707 for ( ; ; ) {
    newfd = accept (fd, (struct aockaddr *)   ~~708
            &cli_addr , &clilen);              ~~709
    childpid = fork ();   ~~710
    if (childpid == 0) {  ~~711
        close (fd);         /* child process */   ~~712
        send and receive data to and from CLIENT;   ~~713
        exit (0);   ~~714
    }
    close (newfd);          /* parent process */   ~~715
```

FIG. 7b

```
#define  SERV_TCP_PORT   6001       ~~750
define  SERV_HOST_ADDR  net1.l     ~~751 fd = socket (AF_INET, SOCK_STREAM , 0);   ~~753 serv_addr . sin_family = AF_INET;   ~~754
serv_addr . sin_addr. s_addr = htonl (SERV_HOST_ADDR);   ~~755
serv_addr . sin_port = htons (SERV_TCP_PORT);            ~~756 connect (fd , (struct sockaddr *) &serv_addr,   ~~758
         sizeof (serv_addr) );

send and receive data to and from SERVER;   ~~759 close (fd);   ~~760
exit (0);     ~~761
```

NETWORK DATA COMMUNICATION SYSTEM

BACKGROUND OF THE INVENTION

The present invention relates to a high-speed data communication system between a client and a server via networks, and more particularly, to a high-speed network data communication system between a remote server connected to a high-speed network such as the ATM network and a client connected to a low-speed network such as the Ethernet.

A system in which a client accesses a file of a remote server via networks, there is a known system in which a client communicates directly with a server by using the TCP/IP (Transmission Control Protocol/Internet Protocol).

The TCP/IP is a high-speed data communication protocol used in internet communication or the like (Douglas E. Comer, "Internetworking With TCP/IP", Vol. 1, Prentice Hall).

As shown in FIG. 6a, the IP is located in a network layer (504, 510, 524) of a protocol stack reference model of the ISO (International Organization for Standardization) and allows data communication to be executed hop by hop between computers existing on a communication route.

When gateways (510, 524) or routers located on the communication route check a destination address of a packet and the destination address is a self address (524), the packet is passed to an upper transport layer (522). If the address is not the self address (510), a routing table is searched and the packet is passed to a network interface driver (data-link layer) designated in the table.

The TCP is located in the transport layer of the reference model. Data communication is executed with the TCP between end-to-end computers while executing flow control, congestion control, and retransmission control.

Communication performance is improved by the flow control which changes a sliding window size according to buffer capacity of the communication partner. When round-trip time increases, it is determined that congestion occurs in the network and transfer speed is suppressed, thereby reducing the congestion in the network.

When timeout of an acknowledgement (ACK) occurs, it is judged that the packet is lost on the communication route and the packet is retransmitted, thereby securing reliable data communication.

As mentioned above, the TCP realizes high-efficiency data communication via a wide-area network by determining the state of the communication route by sender and receiver sites to perform the flow control or the congestion control in an end-to-end manner.

When attention is paid to a communication route of a client/server data communication via networks, a gateway or a router is located in a boundary portion between a LAN and a network, and a packet is sent to a partner via the networks.

A round-trip time from the time a request is transmitted until a response signal is received is long in an end-to-end data communication with a remote station. Consequently, vacancy occurs in the transmission of a packet, and there is a problem that even a high-speed network is used, the performance cannot be fully utilized.

A bottleneck of communication performance via networks is due to congestion or low throughput in the network rather than in the LAN. Therefore, in the TCP, a slow start control is executed on the assumption that congestion occurs in the network. Consequently, there is a problem that even when the high-speed network is used, optional performance cannot be fully realized.

On the other hand, in a high-speed network which can reserve a bandwidth such as an ATM (Asynchronous Transfer Mode) network, the bandwidth of the network which can be used by connections has high speed that is equal to or higher than that of the LAN performance. Moreover, since the bandwidth of communication of the network is reversed for every connection and a data transfer delay can be suppressed within a predetermined time, multi-media data can be received/transmitted.

Therefore, like in the TCP/IP, advantages of the ATM network can be fully used by hop-by-hop execution of the flow control or the congestion control more than by end-to-end execution of the flow control or the congestion control.

However, since the TCP is used in the end-to-end communication, neither a congestion state on a communication route nor the size of the network link of the hop-by-hop communication can be known.

Consequently, the flow control or the congestion control according to the network on the route cannot be performed and there is a problem that the performance and function of the network cannot be fully used.

In order to solve the problems regarding the network, there is a mirroring system for locally forming a copy of a remote file.

According to the mirroring system, however, when a copy of the same file is formed at plurality of locations, maintenance overhead for guaranteeing consistency of the file is incurred.

That is, when the copy file is updated, the changed contents have to be reflected to the other files, and it causes a problem of deterioration in performance by management overhead.

SUMMARY OF THE INVENTION

It is an object of the invention to solve the problems described above and to provide a system in which a server provided as a gateway between a network (for example, LAN) to which a client is connected and an another network (for example, wide area network (WAN)) to which a remote server is connected does not simply route a packet in a network layer but can execute flow control or a congestion control in a hop-by-hop manner, not in an end-to-end manner, in accordance with performance and functions of a network (link) connecting a client and a remote server and performance of each server.

According to the invention, in order to achieve the objects, there is provided a network data communication system for a network data communication in which a first computer connected to a first network and a second computer connected to a second network establish communication via a third computer connected to both of the networks. The third computer includes a communication proxy having a proxy registration table for registering a network address of the second computer and a communication proxy process for receiving a communication packet addressed to the second computer. The third computer searches the proxy registration table when a communication packet which is not addressed to the third computer is received, and when the network address of the communication packet is registered in the proxy registration table, the communication proxy process receives the communication packet and transmits the communication packet to the destination.

The third computer has a communication proxy registration waiting daemon for forming the communication proxy, and the second computer generates the communication proxy process for the communication proxy registration waiting daemon of the third computer and registers the network address of the second computer to the proxy registration table.

The communication proxy process on the third computer receives a communication parameter transmitted from the second computer and registers the communication parameter to the third computer.

When the communication proxy process receives a connection establishment request packet addressed to the second computer from the first computer, the communication proxy process establishes a connection between the communication proxy process and the first computer and further, establishes a connection between the communication proxy process and the second computer.

The third computer has a port number conversion table for converting a first communication port identifier which is used by the second computer for a communication with the first computer to a second communication port identifier which is used by the communication proxy process for communication with the first computer. When the third computer receives a communication packet addressed to the second computer, the first communication port identifier written in the communication packet is converted to the second communication port identifier, thereby allowing the communication proxy process to receive the communication packet.

The communication proxy process sends the communication packet which is addressed from the second computer to the communication proxy process to the first computer.

When the second computer sends the communication packet addressed to the communication proxy process to the first computer, the communication proxy process rewrites a source network address of the communication packet to a network address of the second computer.

BRIEF DESCRIPTION OF THE DRAWINGS

FIG. 7a is a diagram showing an example of a server side client/server data communication program using the TCP/IP;

FIG. 7b is a diagram showing an example of a client side client/server data communication program using the TCP/IP.

DETAILED DESCRIPTION OF THE PREFERRED EMBODIMENTS

When a high-speed network such as the ATM network which can reserve a bandwidth is used in networks, different from low-priced PC or WS, a gateway or a router is desired having high CPU performance and a main memory of large capacity, performing parallel data communication using a plurality of connections by implementing protocol process algorithm suitable for the high-speed network, and securing a buffer region which is large enough for communication and extending the window size so as not to form a gap in transmission of packets.

Figure 6A:
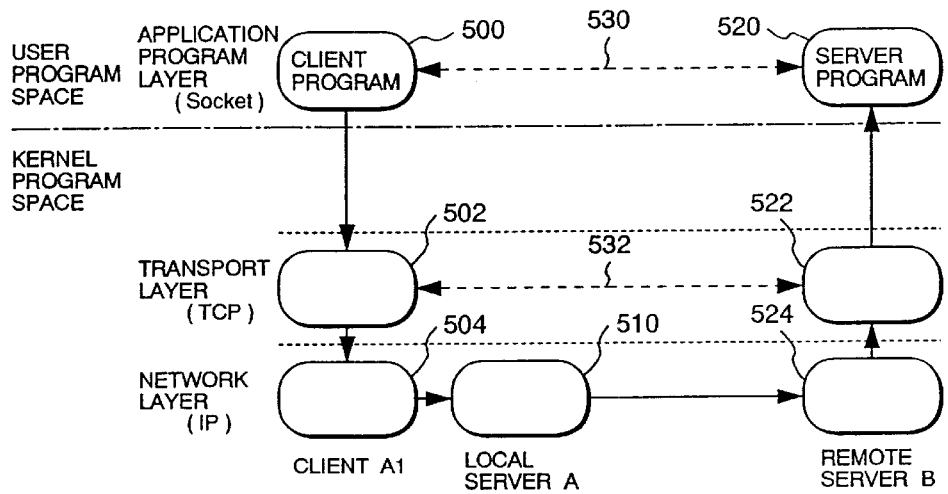
FIG. 6a is a diagram showing a protocol stack in a conventional client/server data communication system.
Figure 6B:
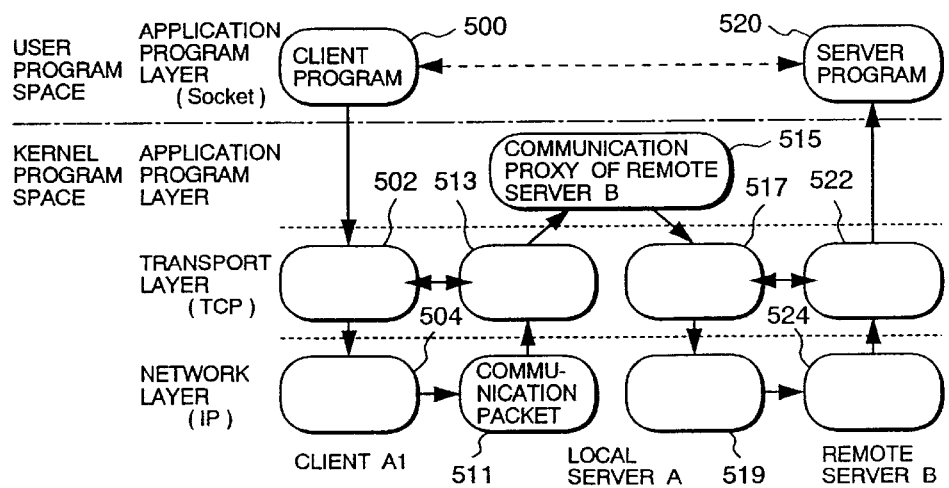
FIG. 6b is a diagram showing a protocol stack in a data communication system according to an embodiment of the invention.

According to the invention, as shown in the data communication between a client A1 and a remote server B (data communication between 500 and 520) in FIG. 6b, a communication proxy (515) of the remote server B is located in a gateway (local server A) in a LAN to which the client A1 belongs, and a communication packet (511) to be routed to the remote server is stolen (received) and is passed to a transport layer (513).

As mentioned above, the data communication in the transport layer between the client A1 and the remote server B (data communication between 502 and 522) is divided into two; communication between the client A1 and the communication proxy of the remote server B (communication between 502 and 513), and communication between the communication proxy of the remote server B and the remote server B (communication between 517 and 522).

Consequently, the flow control and congestion control algorithms in the transport layer suitable to each of the former communication in the LAN and the latter communication via a wide-area network can be applied.

As mentioned above, the high-performance data communication via the wide-area network can be realized without changing a communication program on a client.

Transmission of a packet from the remote server B to the client A1 can be also realized by a procedure opposite to the one described above.

General programming for a data communication using the TCP/IP between a client and a server will be first described with reference to FIGS. 7a and 7b.

Programs shown in FIGS. 7a and 7b are similar to those using a socket described in "UNIX network programming", W. D. Stevens, Prentice Hall.

Reference numerals 701 to 715 correspond to a program executed by the server. Reference numerals 750 to 761 correspond to a program executed by the client.

The server forms a socket (702), addresses the socket (706), and after that, waits for a request to establish a connection from an arbitrary client (704) by a listen ( ) call (707).

After forming a socket (753), the client designates a network address of the server (755) and requests a connection establishment with the server by a connect ( ) call (758).

When the client requests the establishment of the connection by the connect ( ) call and the server accepts the request of the client, the connection between the client and the server is established by an accept ( ) call (709).

The server allocates a descriptor newfd of the socket used in the newly established connection (709), forms an offspring process (710), and data communication is executed between the offspring process and the client (713).

A parent process is returned to a waiting state to receive a request from another client (715, 708).

When the connection is established (758), the client also executes the data communication with a server (759).

Figure 8:
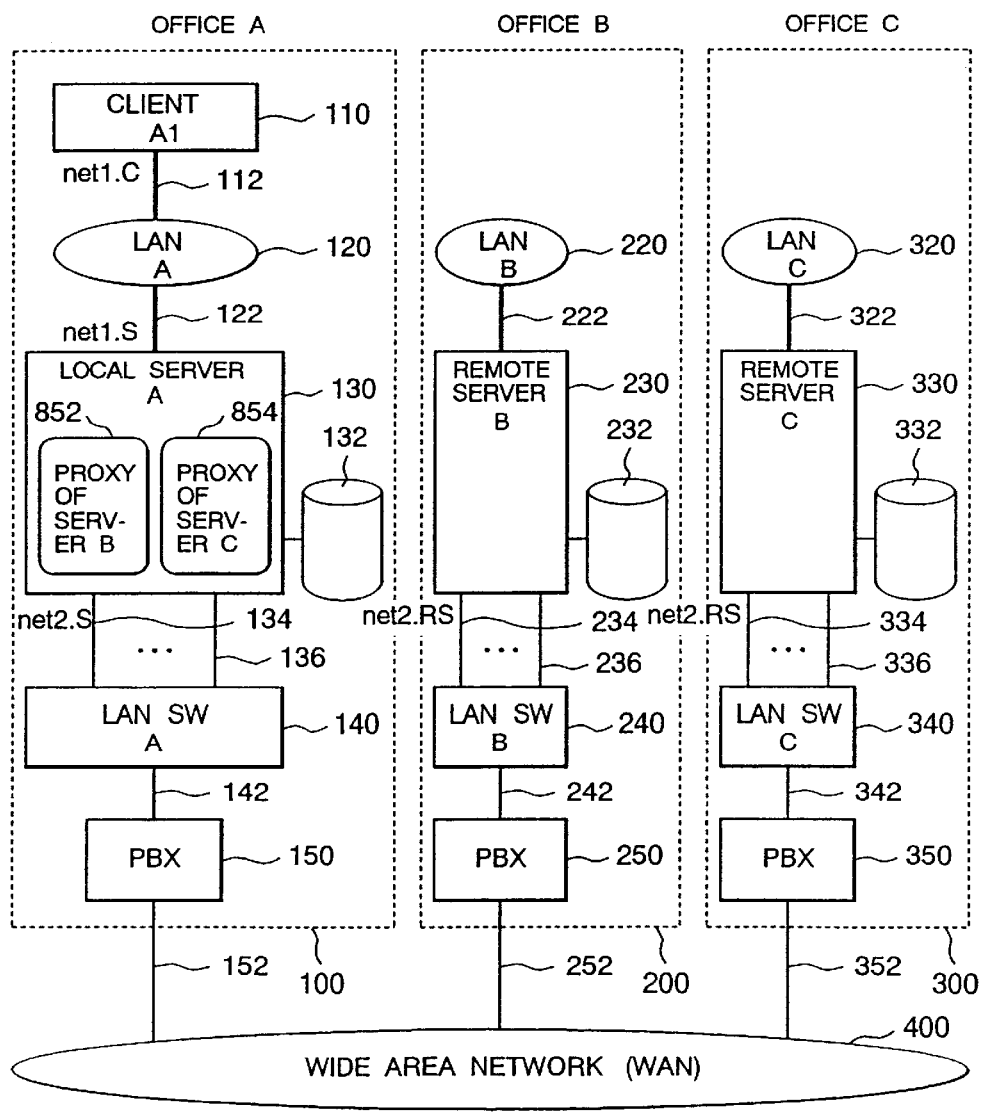
FIG. 8 is a diagram showing an example of a structure of a commuting system as a target of the invention.

FIG. 8 shows an example of a structure of a computing system as a target of the invention.

In FIG. 8, reference numerals 100, 200, and 300 denote offices A, B, and C, respectively.

Reference numeral 110 denotes a client and 130, 230, and 330 indicate servers. When seen from the client 110, 130 is a local server and 230 and 330 are remote servers.

Reference numerals 132, 232, and 332 denote files managed by the servers 130, 230, and 330, respectively; 120, 220, and 320 denote LANs (Local Area Networks); 140, 240, and 340 denote LAN switches like ATM (Asynchronous Transfer Mode) switches; 150, 250, and 350 denote PBXs (Private Branch Exchanges); and 400 a wide area network (WAN).

Reference numerals 852 and 854 on the local server 130 are means to realize the invention and denote proxies of communication ports of the remote servers 230 and 330, respectively.

The client 110 having a network address of net1.C is connected to the LAN 120 via the network 112.

The servers 130, 230, and 330 are connected via networks 122, 222, and 322 to the LANs 120, 220, and 320. The servers 130, 230, and 330 are connected to the LAN switches 140, 240, and 340 via networks 134 to 136, 234 to 236, and 334 to 336, respectively.

The network address on the LAN side of the local server 130 is net1.S and the network address on the LAN switch side is net2.S. The network address on the LAN switch side of the remote server 230 is net2.RS.

Although a plurality of networks are used in the diagram, the LAN switches 140, 240, and 340 can be also connected to the servers 130, 230, and 330 by a single network, respectively.

The LAN switches 140, 240, and 340 are connected to the PBXs 150, 250, and 350 via networks 142, 242, and 342, respectively. The PBXs 150, 250, and 350 are connected to the WAN 400 via networks 152, 252, and 352, respectively.

The LAN switches 140, 240, and 340 are not always necessary. The servers 130, 230, and 330 can be also directly connected to the PBXs.

In FIG. 8, when the client 110 communicates with the remote server 230, the TCP/IP packet is first sent to the local server 130 via the LAN 120 and passes via the communication proxy process 852 of the server A, the LAN switch 140, PBX 150, WAN 400, PBX 250, and LAN switch 240 and finally reaches the remote server 230.

When the client 110 receives the packet from the remote server 230, the packet is sent in the opposite order.

Figure 3:
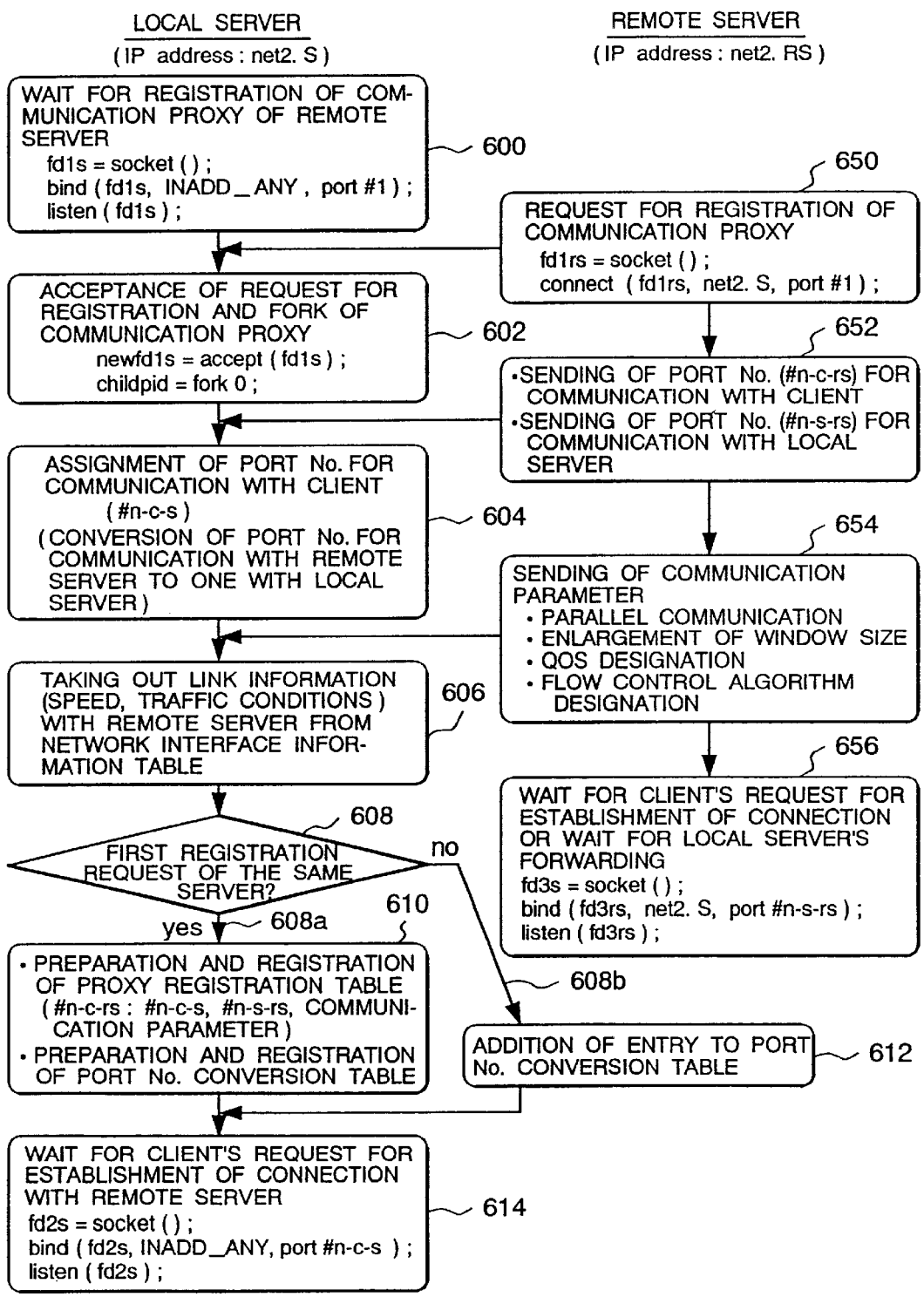
FIG. 3 is a flowchart showing an initial process of a local server and a remote server.

An initial process of the local server 130, communication proxy process 852, and remote server 230 as an embodiment of the invention will be described with reference to FIG. 3.

The initial process is executed between the local server 130 and the remote server 230.

The local server 130 has a communication proxy registration waiting daemon. The local server 130 forms a socket to be bound with a port #1 and waits for a registration request of the communication proxy process from a remote server (600).

The remote server 230 sends a registration request of the communication proxy to the port #1 of the local server 130 (650).

The local server 130 accepts the registration request from the remote server 230 and newly forks (forms) the communication proxy process (602).

When the connection between the local server 130 and the remote server 230 is established, the remote server 230 sends to the local server 130 both of a port number #n-c-rs to be used by the remote server 230 for the communication with the client 110 (when a connection request is sent, a plurality of clients can commonly use the number) and a port number #n-s-rs to be used for the communication between the communication proxy 852 on the local server 130 and the remote server 230 (652).

The port #n-c-rs is used when the local server 130 steals (receives) the TCP/IP packet which is sent by the client 110 to the remote server 230.

The port #n-s-rs is used when the stolen (received) TCP/IP packet is sent from the local server 130 to the remote server 230.

When the port #n-c-rs is received, the communication proxy 852 on the local server 130 allocates a communication port (#n-c-s) of the local server 130 as a communication port to receive the TCP/IP packet sent from the client 110 (604).

When the port #n-c-rs and #n-s-rs are transmitted, the remote server 230 sends a communication parameter indicating how it will communicate with a local server (654).

In the communication parameters, for example, the following options can be designated such as an option for solving deterioration in performance in a long-distance communication due to a small window size of the TCP by establishing a plurality of connections by a parallel communication; an option for expanding the window size of the TCP; an option to use a parameter for securing QOS corresponding to the ATM network and a flow control algorithm corresponding to the ATM network which is different from a conventional network. (With respect to the communication parameter, refer to "ATM internetworking" by Anthony Alles, Cisco Systems, Inc.)

As mentioned above, the communication parameter for realizing the communication control between the servers is passed to the local server 130. The communication control can cope with a problem of latency because of the wide-area network and a high-speed cell-based network such as the ATM network.

The local server 130 extracts the communication parameter received from the remote server 230 and data such as a throughput and a congestion state of a network to be connected to the remote server 230 and executes processes of the flow control and the congestion control with the remote server on the basis of the extracted data (606).

On the basis of the above data, the local server 130 initializes a table or the like necessary to realize the embodiment of the invention.

When this communication proxy registration request is the first request from the remote server 230 (608a), a proxy registration table and a port number conversion table are formed and data is registered (610).

If it is not the first request (608b), an entry of the port number conversion table is added (612).

The details regarding the tables will be described later with reference to FIG. 2.

After completion of the preparation, the local server 130 waits for the client 110 to send the connection establishment request to the remote server 230 (614).

On the other hand, the remote server 230 also waits for the client 110 to send the connection establishment request to the remote server 230, the local server 130 steals (receives) the establishment request and retransmits it from the communication proxy 852 on the local server 130 to the remote server 230 (656).

Figure 2:
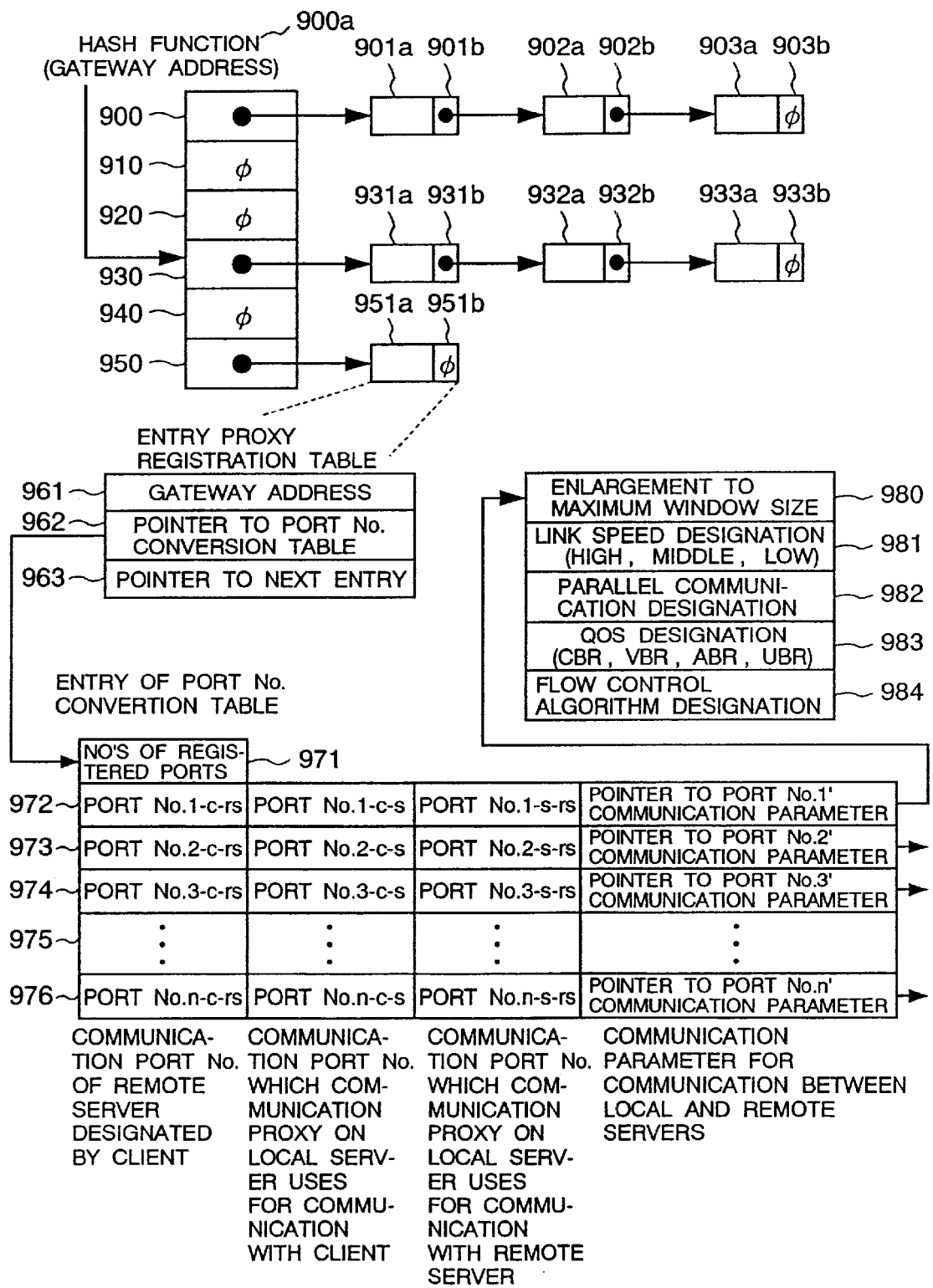
FIG. 2 is a diagram showing an example of a communication proxy registration table and a port number conversion table.

FIG. 2 shows the details of the proxy registration table and the details of the port number conversion table of the embodiment of the invention.

In FIG. 2, reference numerals 900 to 950 denote parallel headers of entries of the proxy registration table according to an embodiment of the invention.

The proxy registration table is searched by using an IP address of a gateway or a router which is obtained by searching a routing table and which sends the packet next.

The destination address is converted by a hash function (900*a*) and entries of the proxy registration table are searched.

The entries of the proxy registration table are constructed by: a network address 961 of a gateway for nextly transmitting the packet as a key of the hash function; a pointer (962); and a pointer 963 for forming a list of the proxy registration table entries. The pointer 962 converts the communication port number (#n-c-rs) of the remote server 230 which is designated when the client 110 establishes communication with the remote server 230 into both of the communication port number (#n-c-s) of the local server 130 which is used when the client 110 establishes the communication with a communication proxy 850 on the local server 130 and the communication port number (#n-s-rs) of the remote server which is used when the communication proxy 850 on the local server 130 establishes the communication with the remote server 230.

Each of the entries of the port number conversion table is constructed by the number (971) of communication ports in which the communications using the proxy from the remote server 230 to the local server 130 are registered and table entries 972 to 976 for converting port numbers.

Further, each entry includes a pointer to the communication parameter table for designating the communication system between the local server 130 and the remote server 230 for every communication connection (every port number).

The communication parameter table is constructed by: a window size expanding option (980) for executing long-distance communication at high speed; a link performance designation parameter (981) indicating that when a high-speed communication link performance between servers is designated, a slow start control as a feature of the TCP protocol does not have to be executed; a parallel communication option 982 which can obtain an effect similar to the expansion of the window size by parallel communication using a plurality of connections; a QOS (Quality Of Service) designation parameter 983 for a communication in which security of the QOS is requested such as multi-media data communication; and a flow control algorithm designation parameter 984 for allowing the flow control suitable to the cell-based network such as the ATM network to be executed.

For the QOS designation, there are various parameters of the QOS specified by the ATM network, such as CBR (Constant Bit Rate), VBR (Variable Bit Rate), ABR (Available Bit Rate), and UBR (Unspecified Bit Rate).

Those parameters are transmitted to the communication proxy process 852 and are used in the communication control between servers.

The operation when the client 110 requests the remote server 230 to establish the connection will be described with reference to FIGS. 1, 2, and 4.

Figure 1:
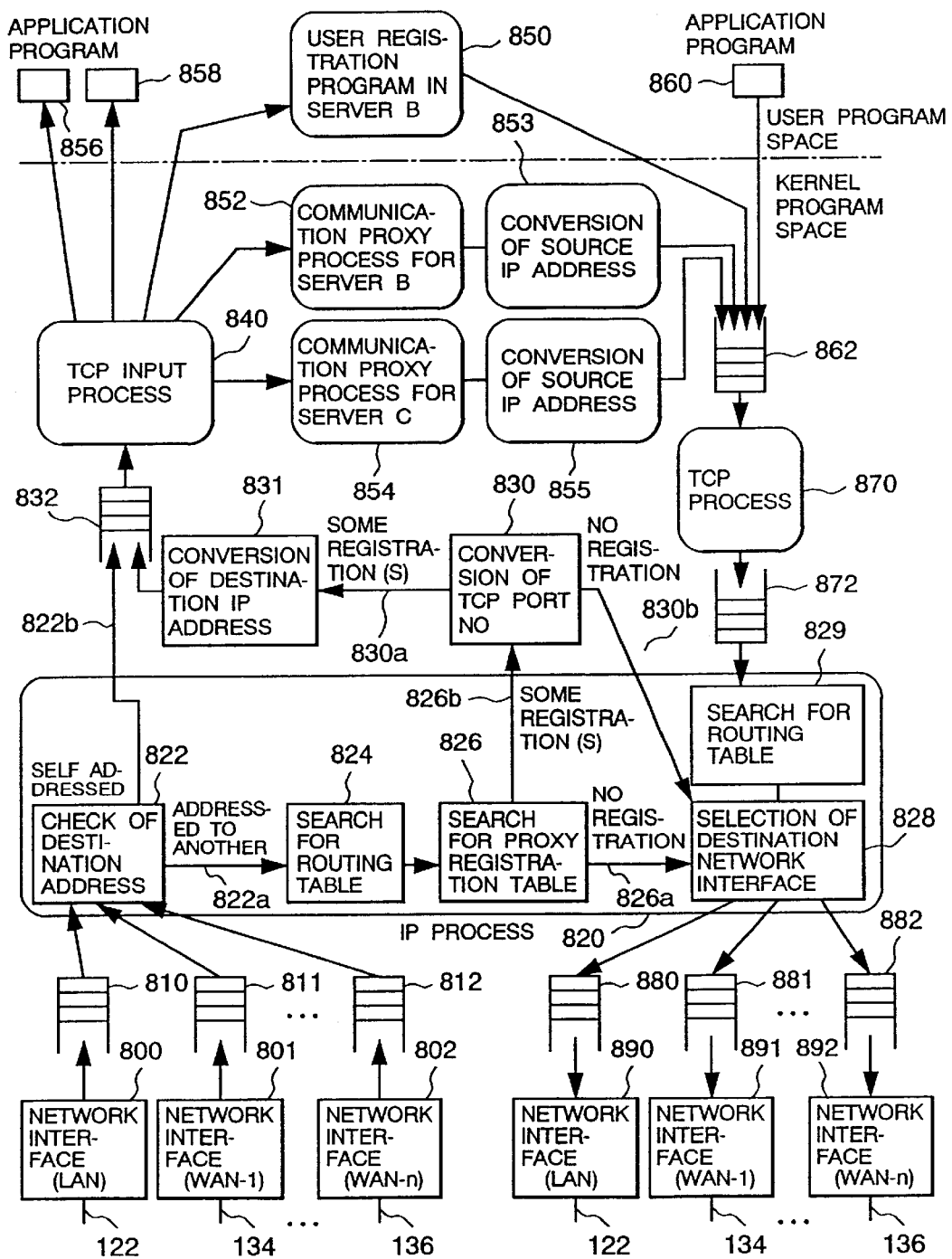
FIG. 1 is a block diagram showing a construction of a first embodiment of the invention.

In FIG. 1, reference numeral 800 denotes a network interface for receiving a packet supplied from the LAN 120; and 801 and 802 indicate network interfaces for receiving packets supplied from the WAN 400.

Reference numerals 810 to 812 denote buffers (queues) of IP packets passed to the IP layer by the network interfaces.

Reference numeral 820 denotes an IP process; 832 a buffer (queue) of a TCP packet which is supplied to the TCP layer by the IP process; and 840 a TCP input process.

Reference numeral 850 denotes a copy of the communication process program in the remote server 230; 852 and 854 the communication proxy processes of the remote servers 230, 330, respectively; and 853 and 855 source IP address conversion routines.

Reference numerals 856, 858, 860 denote application programs; 862 a buffer (queue) of the packet supplied to the TCP layer; 870 a TCP process; and 872 a buffer (queue) of the TCP packet supplied to the IP layer by the TCP process.

Reference numerals 880 to 882 denote buffers (queues) of the IP packets passed to network interfaces 890 to 892 by the IP process; and 890 to 892 the network interfaces for transmitting the output packets to the LAN or WAN.

Figure 4:
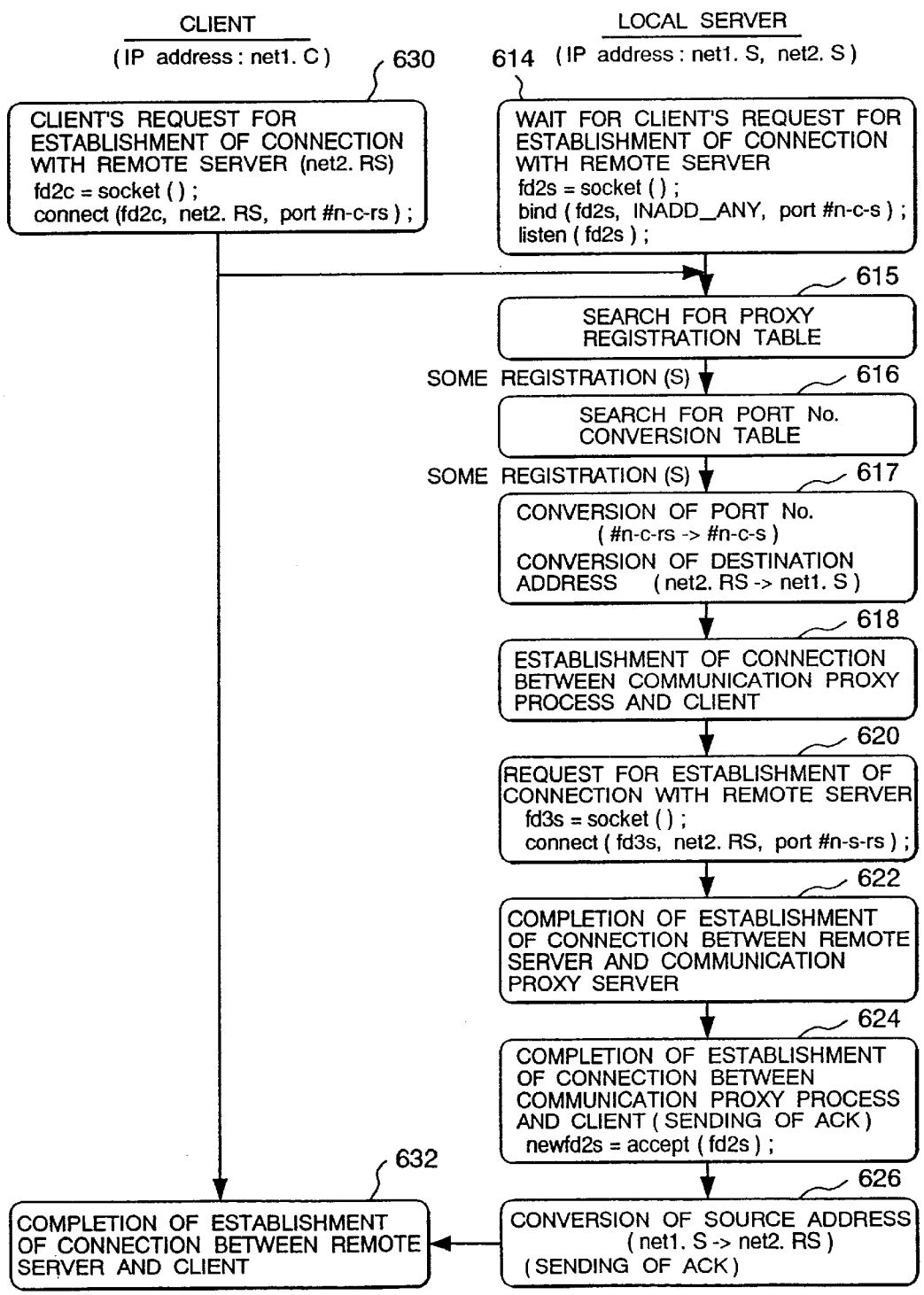
FIG. 4 is a flowchart showing a process for establishing a connection between a client and a local server.
Figure 5A:
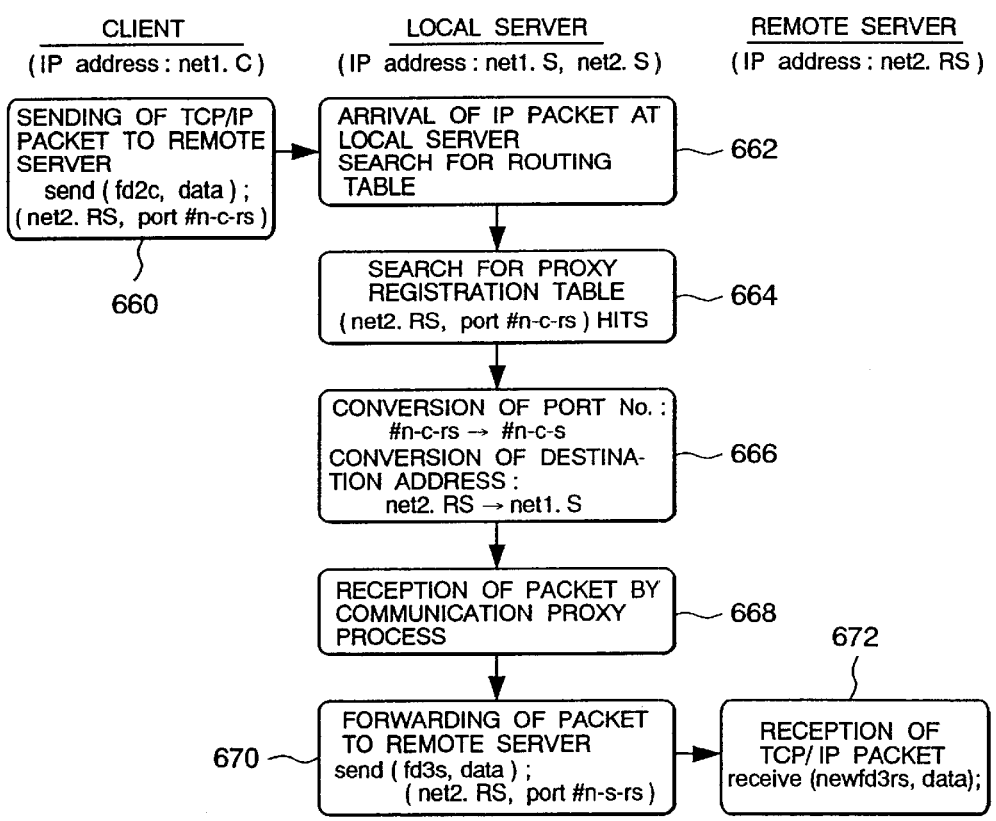
FIGS. 5a and 5b are flowcharts showing data transmitting/receiving processes among a client, a local server, and a remote server.
Figure 5B:
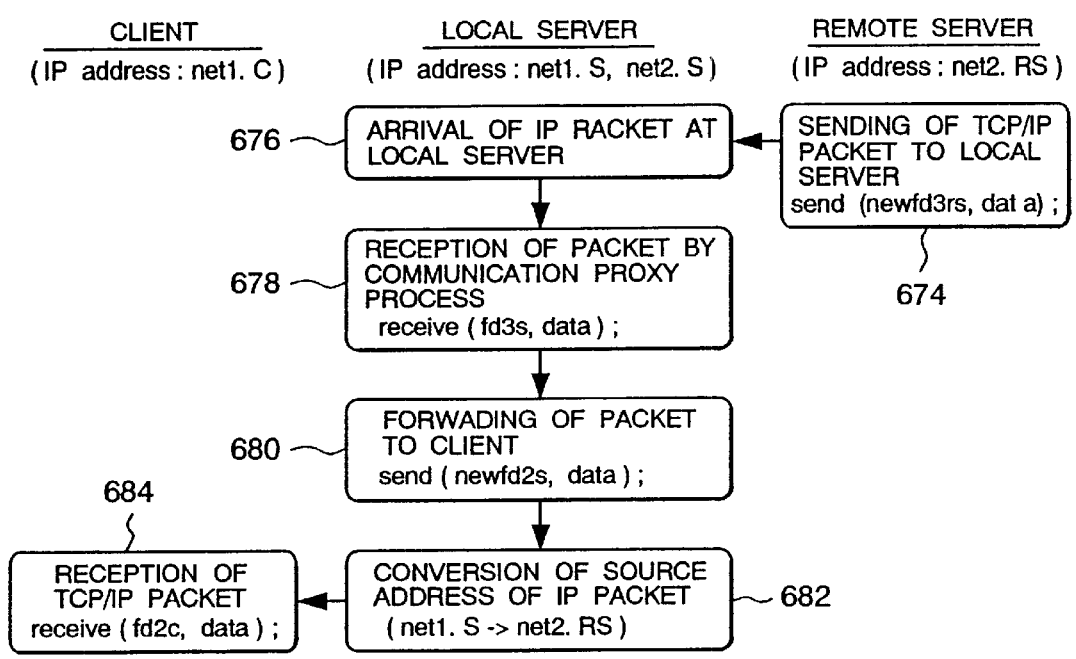

In FIGS. 1, 2, and 4, when the client 110 sends a connection establishment request to the remote server 230 (630), the connection establishment request is sent to the local server 130. If the connection between the client 110 and the local server 130 is not started, the connection establishment request is sent from the local server 130 to the remote server 230. If the connection between the client 110 and the local server 130 is not started, the connection establishment request is sent to the remote server 230 via the local server 130.

The connection establishment request is input to the local server 130 via the network interface 800.

The packet is bufferred by a queue 810 and is passed to the IP process 820.

The IP process 820 determines whether the packet is addressed to the self or to the other packet by checking the destination address of the IP header of the connection establishment request (822).

The connection establishment request packet is addressed to the other, that is, the remote server 230 (822*a*), the routing table of the IP packet is searched and the IP address of the remote server 230 is obtained as the IP address of the gateway which should send the connection establishment request packet (824).

The hash functions are obtained by using the IP addresses as keys (900*a*), the proxy registration table (900 to 950) is searched (826, 615).

Since the communication proxy of the remote server 230 is registered in the proxy registration table in the local server 130, when the proxy registration table is searched by using the IP address of the remote server 230 as a key, it is "hit" (826*b*).

The connection establishment request packet is then sent to the TCP layer and the header of the TCP packet is analyzed, thereby obtaining the communication port number #n-c-rs which is used in the communication with the remote server 230.

When the entries (972 to 976) of the port number conversion table are searched by using the communication port number #n-c-rs of the remote server 230 as a key (616) and an entry is hit, the local server 130 converts the communication port number #n-c-s assigned by the local server 130 for the communication with the client 110 (830, 617).

Further, the destination address of the packet described in the header of the connection establishment request packet is rewritten from the IP address net2.RS of the remote server 230 to the IP address net1.S on the LAN side of the local server 130 (831, 617).

By rewriting the communication port number and the destination IP address, the packet is put into the queue 832 as if it is the connection establishment request addressed to the self (local server 130).

When the communication port number of the remote server 230 is not registered in the port number conversion table (830*b*), as in the conventional technique, a transmission side network interface is selected on the basis of the IP address of the remote server 230 (828), and the connection establishment request packet is forwarded as it is to the remote server 230.

The connection establishment request packet inserted into the queue 832 is multiplexed by the TCP input process 840 on the basis of the communication port number written in the packet header and is transmitted to the communication proxy process 852 of the server B.

Consequently, the request to establish the connection between the communication proxy process 852 of the remote server 230 and the client 110 is accepted (618).

The communication proxy process 852 sends the request to establish the connection with the remote server 230 by using the communication port number #n-s-rs (652) which has been preliminarily sent from the remote server 230 (620).

In this instance, the connection is established according to the communication parameter (654) preliminarily sent from the remote server 230.

When the remote server 230 receives the connection establishment request, the connection between the remote server 230 and the communication proxy process 852 is established (622).

When the connection establishment request is accepted from the remote server 230, the communication proxy process 852 returns an ACK signal for acknowledging the connection establishment to the client 110, thereby completing the establishment of the connection with the client 110 (624).

When returning the packet of the ACK signal, the source IP address is rewritten to the IP address of the remote server 230 not to the IP address of the local server 130 (853, 626), so that the client 110 sees the signal as the ACK signal from the remote server 230.

Consequently, the connection between the client 110 and the remote server 230 can be established by being divided into the connection between the client 110 and the communication proxy process 852 on the local server 130 and the connection between the communication proxy process 852 on the local server 130 and the remote server 230.

A process when the data is transmitted/received between the client 110 and the remote server 230 will be described with reference to FIGS. 1, 2, 5*a*, and 5*b*.

In FIGS. 1, 2, 5*a*, and 5*b*, when the client 110 sends the TCP/IP packet to the port number #n-c-rs of the remote server 230 (660), the packet is sent via the local server 130 to the remote server 230.

The packet is input to the local server 130 via the network interface 800.

The packet is bufferred by the queue 810 and is passed to the IP process 820.

The IP process 820 determines whether the packet is addressed to the self or to the other by checking the destination address of the IP header of the packet (822).

The packet is addressed to the other, that is, to the remote server 230 (822*a*), the routing table of the IP packet is searched and obtains the IP address of the remote server 230 as the IP address of the gateway to which the connection establishment request packet is sent next (824, 662).

The hash function is obtained by using the IP address as a key (900*a*), and the proxy registration table is searched (826, 664).

Since the communication proxy of the remote server 230 is registered in the proxy registration table in the local server 130, when the proxy registration table is searched by using the IP address of the remote server 230 as a key, it is "hit" (826*b*).

The packet is then sent to the TCP layer and the header of the TCP packet is analyzed, thereby obtaining the communication port number #n-c-rs which is used in the communication with the remote server 230.

When the entries (972 to 976) of the port number conversion table are searched by using the communication port number #n-c-rs of the remote server 230 as a key (664) and an entry is hit, it is converted to the communication port number #n-c-s assigned by the local server 130 for the communication with the client 110 (830, 666).

Further, the destination address of the packet described in the header of the packet is rewritten from the IP address net2.RS of the remote server 230 to the IP address net1.S on the LAN side of the local server 130 (831, 666).

By rewriting the communication port number and the destination IP address, the packet is inserted into the queue 832 as if it is addressed to the self (local server 130).

When the communication port number of the remote server 230 is not registered in the port number conversion table (830*b*), as in the conventional technique, a destination network interface is selected on the basis of the IP address of the remote server 230 (828), and the packet is forwarded as it is to the remote server 230.

The packet inserted in the queue 832 is multiplexed by the TCP input process 840 on the basis of the communication port number written in the packet header and is transmitted to the communication proxy process 852 of the server B, and the packet is received (668).

The packets each divided in a size of the MTU (Maximum Transmission Unit) in the TCP layer are reassembled to the original stream.

After that, the communication proxy process 852 divides the data in accordance with the connection conditions (size of the MTU, whether the parallel communication is executed or not, etc.) with the remote server 230 and sends the packet to the communication port number #n-s-rs of the remote server 230 by using the connection established with the remote server 230 (670).

Since the packet is sent through the connection between the servers, the sender site address of the IP packet is not converted and is inserted into the queue 62 as it is.

The TCP process 870 extracts the packet from the queue 862, assembles the TCP packet, and then inserts the packet to the reception queue 872 of the IP process 820.

In the IP process 820, the routing table is searched by using a final destination address as a key to obtain the IP address of the gateway to which the packet is sent subsequently to reach the final destination (829).

Since the IP address is sent to the remote server 230 via the WAN, the network interface 891 is selected (828) among the network interfaces of the local server 130 for transmitting the IP packet, and the IP packet is inserted into the reception queue 881 of the network interface.

The packet is consequently sent to the remote server 230 and the remote server 230 receives the packet (672).

As mentioned above, the packet addressed to the remote server 230 sent from the client 110 to the remote server 230 is transmitted via the communication proxy, process 852 on the local server 130 to the remote server 230 according to the communication control algorithm between the servers.

A case where the client 110 receive data from the emote server 230 will be described next.

When the communication proxy process 852 on the local server 130 receives the packet from the remote server 230, the packet is transmitted to the client 110.

Therefore, the remote server 230 sends the packet not directly to the client 110 but to the communication proxy process 852 on the local server 130 (674).

When the packet arrives at the local server 130 (676), it is input to the local server 130 via the network interface 801 which is connected to the WAN 400.

The packet is bufferred by the queue 811 and then passed to the IP process 820.

The IP process 820 determining whether the packet is addressed to the self or to the other by checking the destination address of the IP header of the packet (822).

Since the packet is addressed to the self (822b), the packet is inserted to the queue 832 as it is.

The packet input to the queue 832 is multiplexed by the TCP input process 840 on the basis of the communication port number written in the packet header and is sent to the communication proxy process 852 of the server B, and the packet is received (678).

The packets each of which was divided to the size of the MTU (Maximum Transmission Unit) in the TCP layer are also reassembled to the original stream. After that, the communication proxy process 852 divides the data according to the conditions of the connection with the client 110 and sends the packet to the client 110 (680).

When returning the packet, the source IP address is rewritten not to the IP address of the local server 130 but to the IP address of the remote server 230 (853, 682), so that the client 110 sees the packet as if it is the packet from the remote server 230.

After rewriting the IP address, the packet is inserted into the queue 862.

The TCP process 870 extracts the packet from the queue 862, assembles the TCP packet, and after that, inserts the packet to the reception queue 872 of the IP process 820.

In the IP process 820, the routing table is searched by using the final destination address as a key and the IP address of the gateway to which the packet is subsequently sent to reach the final destination (829).

The IP address selects the network interface 890 among the network interfaces of the local server 130 for transmitting the IP packet (828), and inserts the IP packet into the reception queue 880 of the selected network interface.

The packet is consequently sen t to the client 110 and the client 110 receives the packet (684).

As a result, the packet addressed to the client 110 sent from the remote server 230 is transmitted to the client 110 via t he communication proxy process 852 on the local server 130 in accordance with the communication control algorithm between the servers.

As mentioned above, the data communication between the client 110 and the remote server 230 can be divided in two via the local server as a gateway of the LAN and the WAN; the communication between the client 110 and the local server 130 in the transport layer, and the communication between the local server 130 and the remote server 230 in the transport layer.

Consequently, between the high-performance servers such as the local server 130 and the remote server 230, the remote data communication between the high-speed servers can be realized by using the protocol process algorithm in the transport layer of the flow control or the congestion control suitable to the high-performance server or the high-speed WAN such as the ATM network.

Further, also in the data communication between the client and the local server, the high-speed data communication can be realized by using the flow control or the congestion control using the short-distance communication LAN and the high-speed performance of the LAN.

Further, since the local server 130 steals (receives) the communication packet transmitted between the client 110 and the remote server 230, the communication can be divided into two communications in both of the LAN and the WAN without letting the client 110 know about it. Therefore, the high speed performance can be realized without needing to change the existing software.

Although the communication between the remote server B (230) and the client A1 (110) has been described according to the embodiment, a communication between a remote server C (330) and the client Al (110) is substantially the same.

The proxy of the communication port of the remote server is registered in the proxy registration table in the embodiment. However, if the remote server 230 sends an object including a program code and a processing method to the local server 130, not that the local server 130 forks the offspring process from the format of the communication proxy (602), it is also possible to register the user registration program 850 shown in FIG. 1 to the local server 130 by the same procedure as that in FIG. 3.

According to the embodiment, only one of the gateways or routers routed the packet on the communication route between the client 110 and the remote server 230. However, even when a plurality of gateways or routers exist on the communication route, if the proxy registration table and the port number conversion table according to the embodiment of the invention are provided to each of the gateways or routers, the hop-by-hop communication process can be also executed by a similar procedure.

If the proxy is not registered in the proxy registration table as the embodiment of the invention, the hop-by-hop communication process is not executed but a control every plurality of proxies can be executed.

The high-speed communication system between the public data network (WAN) and the office has been described in the embodiment. The invention can be also applied to the LAN constructed by a plurality of networks having different speeds and media such as ATM and LAN and Ethernet and LAN.

As mentioned above, according to the invention, there is provided the system in which the server functioning as the gateway between the network (for example, LAN) to which the client is connected and the other network (for example, WAN) to which the remote server is connected can execute the flow control or the congestion control according to the performance and function of the network (link) between the client and the remote server and the performances of the client and the remote server, and the high-speed data communication via the network can be realized.

What is claimed is:

1. A network data communication system for a network data communication, comprising:

a first computer connected to a first network;

a second computer connected to a second network; and a third computer connected to both of said first and second networks for establishing communication thereinbetween, wherein said third computer includes a communication proxy having a proxy registration table for registering a network address of said second computer and a communication proxy process for receiving a communication packet addressed to said second computer, said third computer searches said proxy registration table when a communication packet which is not addressed to said third computer is received, when a destination network address of the communication packet is registered in said proxy destination table, the communication proxy process receives the communication packet and transmits the communication packet to the destination, said communication proxy process on said third computer receives a communication parameter transmitted from said second computer and registers the communication to said third computer, wherein said third computer has a port number conversion table for converting a first communication port identifier which is used by said second computer for communication with said first computer into a second communication port identifier which is used by said communication proxy process for communication with said first computer, and when a communication packet addressed to said second computer is received, the first communication port identifier written in the communication packet is converted to the second communication port identifier, thereby allowing said communication proxy process to receive the communication packet.

2. A third computer connected to both of said first network to which a first computer is connected and a second network to which a second computer is connected, comprising:

a registration table for registering a network address of said second computer;

means for searching the registration table when a communication packet which is not directed to said third computer is received;

a communication process for receiving a communication packet addressed to said second computer when a network address of a destination of the communication packet is registered in said registration table;

means for transmitting the communication packet to the destination;

a correspondence table between a first communication port identifier used by said second computer for a communication with said first computer and a second communication port identifier used by said communication process for a communication with said first computer; and means for allowing a communication packet addressed to said second computer to be received by said communication process by converting the first communication port identifier written in said communication packet to the second communication port identifier.

3. A network data communication system for a network data communication comprising:

a first computer connected to a first network;

a second computer connected to a second network; and a third computer connected to both of said first and second networks for establishing communication thereinbetween, wherein said third computer includes a communication proxy having a proxy registration table and a communication proxy process for receiving a communication packet addressed to said second computer, wherein said proxy registration table contains a network address of said second computer and communication parameters designating a communication method to be employed in communication between said communication proxy process and said second computer, wherein said third computer searches said proxy registration table when a communication packet which is not addressed to said third computer is received, wherein when a destination network address of the communication packet is registered in said proxy registration table, the communication proxy process receives the communication packet and transmits the communication packet to the destination according to the communication method designated by said communication parameters registered in said proxy registration table, and wherein said communication parameters include a parameter designating quality of service specified by ATM network.

* * * * *